(12) United States Patent
Takahashi

(10) Patent No.: US 10,018,531 B2
(45) Date of Patent: Jul. 10, 2018

(54) CONTROL APPARATUS AND CONTROL METHOD FOR INTERNAL COMBUSTION ENGINE

(71) Applicant: TOYOTA JIDOSHA KABUSHIKI KAISHA, Toyota-shi (JP)

(72) Inventor: Machiko Takahashi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 106 days.

(21) Appl. No.: 15/054,967

(22) Filed: Feb. 26, 2016

(65) Prior Publication Data

US 2016/0252020 A1 Sep. 1, 2016

(30) Foreign Application Priority Data

Feb. 27, 2015 (JP) .................... 2015-038830

(51) Int. Cl.
*G01M 15/08* (2006.01)
*F02D 23/02* (2006.01)
(Continued)

(52) U.S. Cl.
CPC ......... *G01M 15/08* (2013.01); *F02D 13/0238* (2013.01); *F02D 23/02* (2013.01);
(Continued)

(58) Field of Classification Search
CPC .... G01M 15/08; G01M 15/05; G01M 15/042; F02D 13/0238; F02D 41/0002;
(Continued)

(56) References Cited

U.S. PATENT DOCUMENTS 6,510,835 B1   1/2003  Mizuno et al.
7,305,967 B1 * 12/2007  Hagari ............... F02D 9/02
                                                 123/403
(Continued)

FOREIGN PATENT DOCUMENTS

EP      1 602 811 A2   12/2005
EP      1 624 173 A2    2/2006
(Continued)

*Primary Examiner* — Joseph Dallo
*Assistant Examiner* — Scott A Reinbold
(74) *Attorney, Agent, or Firm* — Oblon, McClelland, Maier & Neustadt, L.L.P.

(57) ABSTRACT

A control apparatus for an engine, the control apparatus includes an ECU. The ECU is configured to: calculate a normalized intake pressure; calculate a pumping loss torque based on the normalized intake pressure; calculate a first value or a value of a linear function as the normalized intake pressure, the first value is obtained by dividing the intake pressure by the atmospheric pressure; calculate the output value based on the normalized intake pressure and a relational data that associate a normalized output value with the normalized intake pressure; the output value is one of a second value obtained by dividing the pumping loss torque by the atmospheric pressure, a normalized pumping loss torque, a third value obtained by dividing an exhaust pressure by the atmospheric pressure, and a normalized exhaust pressure; and calculate one of the pumping loss torque and the exhaust pressure.

11 Claims, 7 Drawing Sheets

(51) Int. Cl.
*F02D 41/24* (2006.01)
*F02D 41/00* (2006.01)
*F02D 13/02* (2006.01)
*G01M 15/04* (2006.01)
*F02D 41/14* (2006.01)
*F02D 41/18* (2006.01)
*F02P 5/04* (2006.01)
*F02D 37/02* (2006.01)

(52) U.S. Cl.
CPC ..... *F02D 41/0002* (2013.01); *F02D 41/1448* (2013.01); *F02D 41/2409* (2013.01); *G01M 15/042* (2013.01); *F02D 37/02* (2013.01); *F02D 41/1401* (2013.01); *F02D 41/18* (2013.01); *F02D 2041/001* (2013.01); *F02D 2041/002* (2013.01); *F02D 2041/1434* (2013.01); *F02D 2200/0402* (2013.01); *F02D 2200/0406* (2013.01); *F02D 2200/101* (2013.01); *F02D 2200/1006* (2013.01); *F02D 2200/602* (2013.01); *F02D 2200/703* (2013.01); *F02D 2250/18* (2013.01); *F02D 2700/035* (2013.01); *F02P 5/045* (2013.01); *Y02T 10/144* (2013.01); *Y02T 10/18* (2013.01); *Y02T 10/42* (2013.01)

(58) Field of Classification Search
CPC .. F02D 41/2409; F02D 41/1448; F02D 23/02; F02D 2200/602; F02D 2200/101; F02D 41/1401; F02D 2200/0406; F02D 2250/18; F02D 2041/1434; F02D 2200/703; F02D 13/0253; Y02T 10/144; Y02T 10/18; Y02T 10/42
USPC ......................................................... 701/105
See application file for complete search history.

(56) References Cited

U.S. PATENT DOCUMENTS

| | | | | |
|---|---|---|---|---|
| 7,536,249 | B2* | 5/2009 | Muller | F02D 41/1448 701/102 |
| 2004/0044461 | A1* | 3/2004 | Ueda | F02D 41/1498 701/111 |
| 2006/0229158 | A1 | 10/2006 | Ichihara | |
| 2007/0113808 | A1* | 5/2007 | Lyngfelt | F01L 1/022 123/90.16 |
| 2013/0239669 | A1 | 9/2013 | Hagari et al. | |
| 2013/0282256 | A1* | 10/2013 | Watanuki | F02D 23/02 701/102 |
| 2014/0343824 | A1* | 11/2014 | Ito | F02D 41/04 701/103 |
| 2015/0013640 | A1* | 1/2015 | Watanuki | F02D 43/00 123/350 |
| 2015/0211961 | A1* | 7/2015 | Ueno | F02D 13/0261 73/114.22 |
| 2015/0226137 | A1* | 8/2015 | Hagari | F02D 11/10 123/344 |

FOREIGN PATENT DOCUMENTS

| | | |
|---|---|---|
| JP | 2-256850 A | 10/1990 |
| JP | 2000-64900 | 2/2000 |
| JP | 2000-297688 A | 10/2000 |
| JP | 2005-307802 A | 11/2005 |
| JP | 2005-344565 | 12/2005 |
| JP | 2006-46177 A | 2/2006 |
| JP | 2006-291803 A | 10/2006 |
| JP | 2010-133426 A | 6/2010 |
| JP | 2012-82808 A | 4/2012 |
| JP | 2013-194587 A | 9/2013 |

\* cited by examiner

| Pm/ekpa REFERENCE VALUE [kPa] | 47 | | 77 | |
|---|---|---|---|---|
| Pa [kPa] | 70.8 | 102.2 | 70.8 | 102.2 |
| Pm [kPa] | 32.5 | 47.3 | 53.7 | 77.5 |
| Pm/ekpa [kPa] | 46.4 | 46.9 | 76.9 | 76.8 |
| PUMPING LOSS TORQUE [Nm] | 6.0 | 8.9 | 5.4 | 8.5 |
| Pump | 6.2 | | 5.9 | |
| ERROR [%] | 3.6 | | 8.9 | |

CONTROL APPARATUS AND CONTROL METHOD FOR INTERNAL COMBUSTION ENGINE

INCORPORATION BY REFERENCE

The disclosure of Japanese Patent Application No. 2015-038830 filed on Feb. 27, 2015 including the specification, drawings and abstract is incorporated herein by reference in its entirety.

BACKGROUND

1. Technical Field

The disclosure relates to a control apparatus and a control method for an internal combustion engine that calculate a pumping loss torque.

2. Description of Related Art

Japanese Patent Application Publication No. 2000-064900 (JP 2000-064900 A) discloses an apparatus that estimates a pumping loss (a pumping loss torque) based on a difference between an integrated value of an in-cylinder pressure detected by an in-cylinder pressure sensor in an exhaust stroke and an integrated value of the in-cylinder pressure detected by the in-cylinder pressure sensor in a suction stroke.

SUMMARY

It may be difficult to apply the aforementioned apparatus to an engine where the in-cylinder pressure sensor is not provided. It may be also conceivable to substitute an intake pressure detected by an intake pressure sensor for the in-cylinder pressure in the suction stroke, and substitute a detected value of an exhaust pressure sensor that detects a pressure in an exhaust passage for the in-cylinder pressure in the exhaust stroke. In this case, however, both the intake pressure sensor and the exhaust pressure sensor are needed. The inventor has found out that the exhaust pressure depends on an atmospheric pressure and the intake pressure, and has attempted to calculate the pumping loss torque based on the atmospheric pressure and the intake pressure. However, when the pumping loss torque is calculated simply using the atmospheric pressure and the intake pressure instead of the exhaust pressure, data that associate at least the atmospheric pressure and the intake pressure with the exhaust pressure and the pumping loss torque are adapted. In consequence, the man-hour for adaptation increases.

The disclosure provides a control apparatus and a control method for an internal combustion engine that can calculate a pumping loss torque from an intake pressure and an atmospheric pressure while restraining the man-hour for adaptation from increasing.

An example aspect of the disclosure provides a control apparatus for an internal combustion engine, the internal combustion engine including an intake passage, an exhaust passage and an actuator, the control apparatus comprising an electronic control unit. The electronic control unit is configured to: output a command signal to the actuator and control a controlled variable of the internal combustion engine; acquire an intake pressure in the intake pressure; acquire an atmospheric pressure; calculate a normalized intake pressure, the normalized intake pressure being a pressure obtained by normalizing the intake pressure by the atmospheric pressure; calculate a pumping loss torque of the internal combustion engine based on the normalized intake pressure; calculate a first value or a value of a linear function in which the first value is an independent variable as the normalized intake pressure, the first value being obtained by dividing the intake pressure by the atmospheric pressure; store relational data, the relational data being data that associate an output value normalized by the atmospheric pressure with the normalized intake pressure; calculate the output value based on the normalized intake pressure and the relational data, the output value being one of a second value obtained by dividing the pumping loss torque by the atmospheric pressure, a normalized pumping loss torque as a value of a linear function in which the second value is an independent variable, a third value obtained by dividing an exhaust pressure as a pressure in the exhaust passage by the atmospheric pressure, and a normalized exhaust pressure as a value of a linear function in which the third value is an independent variable; and calculate one of the pumping loss torque based on the normalized pumping loss torque and the atmospheric pressure, and the exhaust pressure based on the normalized exhaust pressure and the atmospheric pressure, the exhaust pressure being utilized to calculate the pumping loss torque based on a differential pressure from the intake pressure.

According to the aforementioned configuration, the pumping loss torque can be calculated from the intake pressure and the atmospheric pressure while restraining the man-hour for adaptation from increasing. In the control apparatus, the output value normalized by the atmospheric pressure may be the normalized pumping loss torque, the electronic control unit may be configured to calculate the normalized pumping loss torque based on the normalized intake pressure, and the electronic control unit may be configured to calculate the pumping loss torque based on the normalized pumping loss torque and the atmospheric pressure.

In the aforementioned configuration, the relational data associate the normalized pumping loss torque with the normalized intake pressure. Therefore, the arithmetic operation load can be made smaller than in the case where the normalized exhaust pressure is associated with the normalized intake pressure, because the process of calculating the pumping loss torque from the exhaust pressure is not executed.

In the control apparatus, the internal combustion engine may be further equipped with a variable valve characteristic mechanism, the variable valve characteristic mechanism may be configured to change a valve characteristic of an intake valve of the internal combustion engine, the relational data relate a valve-opening timing of the intake valve to the normalized pumping loss torque in addition to the normalized intake pressure, the relational data associate the normalized pumping loss torque such that the normalized pumping loss torque when the valve-opening timing is on a retardation side is larger than the normalized pumping loss torque when the valve-opening timing is on an advancement side, and the electronic control unit may be configured to calculate the normalized pumping loss torque based on the valve-opening timing and the relational data in addition to the normalized intake pressure.

In the case where the valve-opening timing of the intake valve is retarded, the work applied to the piston by intake air during displacement of the piston toward the bottom dead center decreases when the work applied to the piston by the working fluid is assumed to be positive. Therefore, in the case where the value obtained by subtracting the work applied to the piston by the working fluid in a suction stroke from the work applied to the working fluid by the piston in an exhaust stroke has the same sign as the pumping loss torque, the pumping loss torque increases as the valve-opening timing of the intake valve is retarded. In the aforementioned configuration, in view of this point, the pumping loss torque is calculated in accordance with the valve-opening timing of the intake valve. Thus, the pumping loss torque can be calculated with higher accuracy.

In the control apparatus, the electronic control unit may be configured to calculate a same value of the normalized pumping loss torque as in a case where an amount of advancement of the valve-opening timing with respect to a top dead center of a piston is equal to a prescribed value, when the amount of advancement is equal to or larger than the prescribed value, and the prescribed value may be a value equal to or larger than zero.

In the case where the valve-opening timing of the intake valve coincides with the top dead center or is advanced from the top dead center to a certain extent, even if the valve-opening timing is further advanced, the amount of work applied to the piston by intake air does not change when the piston begins to be displaced toward the bottom dead center. In the aforementioned configuration, in view of this point, when the amount of advancement of the valve-opening timing of the intake valve with respect to the top dead center of the piston is equal to or larger than the prescribed value, the same value of the normalized pumping loss torque as in the case where the amount of advancement is equal to the prescribed value is calculated.

In the control apparatus, the relational data may include first data and second data, the first data is a data when the amount of advancement of the valve-opening timing with respect to the top dead center of the piston is equal to the prescribed value, and the second data is a data when the valve-opening timing is most retarded, and the electronic control unit may be configured to calculate the output value normalized by the atmospheric pressure through an interpolating arithmetic operation of the output value normalized by the atmospheric pressure in each of the first data and the second data, when the amount of advancement of the valve-opening timing with respect to the top dead center of the piston is smaller than the prescribed value.

As the valve-opening timing is retarded from the TDC, the work applied to the piston by intake air decreases in the case where the work applied to the piston by the working fluid is assumed to be positive. Therefore, in the case where the value obtained by subtracting the work applied to the piston by the working fluid in a suction stroke from the work applied to the working fluid by the piston in an exhaust stroke has the same sign as the pumping loss torque, the pumping loss torque monotonically increases as the valve-opening timing is retarded from the TDC. In the aforementioned configuration, in view of this point, the output value in the case where the aforementioned amount of advancement is smaller than the prescribed value is calculated by executing an interpolating arithmetic operation of the output value according to each of the two pieces of data. Therefore, the pumping loss torque that monotonically increases as the valve-opening timing is retarded can be appropriately calculated while restraining the volume of data from increasing as much as possible.

In the control apparatus, the output value normalized by the atmospheric pressure may be the normalized exhaust pressure. The electronic control unit may be configured to calculate the normalized exhaust pressure based on the normalized intake pressure. The electronic control unit may be configured to calculate the exhaust pressure based on the normalized exhaust pressure and the atmospheric pressure, and the electronic control unit may be configured to calculate the pumping loss torque based on the differential pressure between the exhaust pressure and the intake pressure.

The pumping loss is a work that is applied to the piston by the gas in the combustion chamber in a suction stroke and an exhaust stroke. When the pressure in the combustion chamber in the suction stroke and the pressure in the combustion chamber in the exhaust stroke are approximated by the intake pressure and the exhaust pressure respectively, the pumping loss can be obtained by multiplying the differential pressure between the exhaust pressure and the intake pressure by the volume pushed away by the piston during its displacement from the top dead center to the bottom dead center. On the other hand, the pumping loss torque is different from the pumping loss by the multiple of a constant. Therefore, the pumping loss torque can also be calculated based on the differential pressure between the exhaust pressure and the intake pressure. In the aforementioned configuration, in view of this point, the pumping loss torque is calculated based on the differential pressure between the exhaust pressure calculated by the non-normalized value calculation process unit and the acquired intake pressure.

In the control apparatus, the relational data may relate a rotational speed of the internal combustion engine to the output value in addition to the normalized intake pressure, and the electronic control unit may be configured to calculate the output value based on the rotational speed and the relational data in addition to the normalized intake pressure.

The relationship between the output value normalized by the atmospheric pressure and the normalized intake pressure depends on the rotational speed. In the aforementioned configuration, in view of this point, the output value normalized by the atmospheric pressure is calculated in consideration of the rotational speed. In the control apparatus, the relational data may relate a rotational speed of the internal combustion engine to the output value in addition to the normalized intake pressure and the valve-opening timing, and the electronic control unit may be configured to calculate the output value based on the normalized intake pressure, the valve-opening timing, the rotational speed and the relational data.

The relationship between the output value normalized by the atmospheric pressure and the normalized intake pressure depends on the rotational speed. In the aforementioned configuration, in view of this point, the output value noiialized by the atmospheric pressure is calculated in consideration of the rotational speed. In the control apparatus, the electronic control unit may be configured to calculate a required axial torque of the internal combustion engine, the electronic control unit may be configured to calculate a required indicated torque of the internal combustion engine based on a process of adding a friction torque of the internal combustion engine to the required axial torque, and the electronic control unit may be configured to set an operation amount of the actuator of the internal combustion engine based on a value obtained by adding the pumping loss torque to the required indicated torque.

In the aforementioned configuration, the operation amount of the actuator of the internal combustion engine is set based on the value obtained by adding the pumping loss torque to the required indicated torque, so the operation amount can be set in consideration of the pumping loss torque. Therefore, the axial torque of the internal combustion engine can be controlled to the required axial torque with high accuracy.

In the control apparatus, the internal combustion engine may include a throttle valve. The electronic control unit may be configured to store air amount conversion data and intake pressure conversion data, the air amount conversion data associate the value obtained by adding the pumping loss torque to the required indicated torque with a target air amount, and the intake pressure conversion data associate the target air amount with the intake pressure. The electronic control unit may be configured to calculate the target air amount using the air amount conversion data and then execute a process of calculating a target intake pressure using the calculated target air amount and the intake pressure conversion data, the target air amount being an arithmetic parameter to set an opening degree of the throttle valve, and a process of acquiring the intake pressure being a process of acquiring the target intake pressure.

In the aforementioned configuration, the target intake pressure corresponding to the target air amount that is utilized by the operation amount calculation process unit in setting the operation amount (the opening degree) of the throttle valve is acquired by the intake pressure acquisition process unit. Then, the target intake pressure is normalized by the normalization process unit. Thus, the normalized intake pressure is calculated. Therefore, in the pumping loss torque calculation process unit, the pumping loss torque corresponding to the intake pressure that is assumed through the process of setting the opening degree of the throttle valve by the operation amount calculation process unit can be calculated.

Another example aspect of the disclosure provides a control method for an internal combustion engine, the internal combustion engine including an intake passage, an exhaust passage and an actuator, the control method includes: acquiring an intake pressure of the intake passage; acquiring an atmospheric pressure; calculating a normalized intake pressure, the normalized intake pressure being a pressure obtained by normalizing the intake pressure by the atmospheric pressure; calculating a pumping loss torque of the internal combustion engine based on the normalized intake pressure; calculating a first value or a value of a linear function in which the first value is an independent variable as the normalized intake pressure, the first value being obtained by dividing the intake pressure by the atmospheric pressure; storing relational data, the relational data being data that associate an output value normalized by the atmospheric pressure with the normalized intake pressure, calculating the output value based on the normalized intake pressure and the relational data, the output value being one of a second value obtained by dividing the pumping loss torque by the atmospheric pressure, a normalized pumping loss torque as a value of a linear function in which the second value is an independent variable, a third value obtained by dividing an exhaust pressure as a pressure in the exhaust passage by the atmospheric pressure, and a normalized exhaust pressure as a value of a linear function in which the third value is an independent variable; and calculating one of the pumping loss torque based on the normalized pumping loss torque and the atmospheric pressure, and the exhaust pressure based on the normalized exhaust pressure and the atmospheric pressure, the exhaust pressure being utilized to calculate the pumping loss torque based on a differential pressure from the intake pressure.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
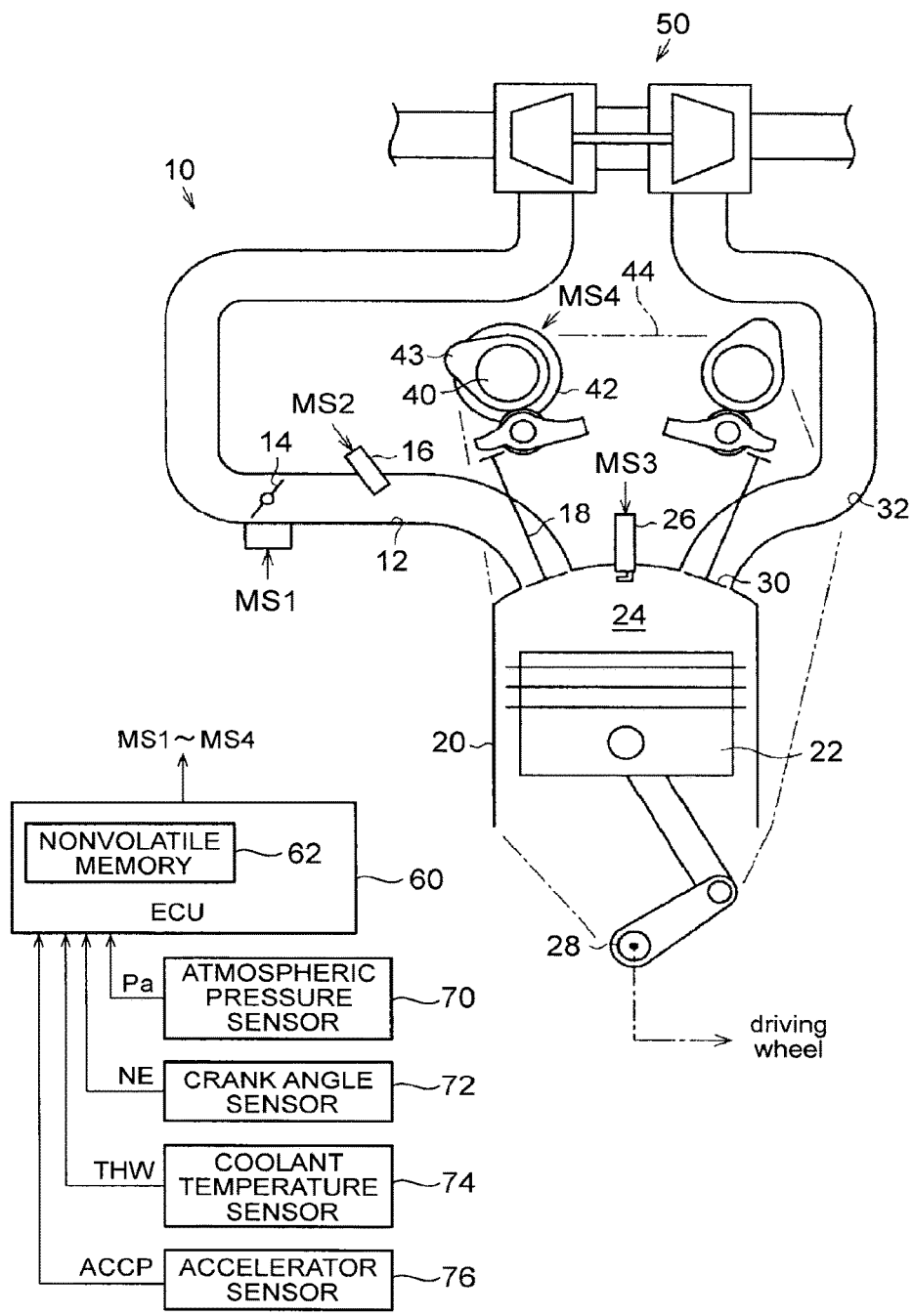
FIG. 1 is a view of an engine system including a control apparatus for an internal combustion engine according to a first embodiment.

The inventor has found out that although "(an exhaust pressure)–(an actual atmospheric pressure)" depends on the actual atmospheric pressure as well as an intake pressure, a corresponding relationship between values obtained by dividing "(the exhaust pressure)–(the actual atmospheric pressure)" and the intake pressure respectively by a correction coefficient that is obtained by dividing the actual atmospheric pressure by a predetermined atmospheric pressure (a reference atmospheric pressure) that is assumed at a spot located at a height of 100 m or less above sea level can be regarded as independent of the actual atmospheric pressure. Accordingly, the man-hour for adaptation can be reduced when relational data that associate a value obtained by dividing the aforementioned intake pressure by the correction coefficient with a value obtained by dividing "(the exhaust pressure)–(the actual atmospheric pressure)" by the correction coefficient are generated instead of generating relational data that associate the intake pressure and the actual atmospheric pressure with "(the exhaust pressure)–(the actual atmospheric pressure)".

The value obtained by dividing "(the exhaust pressure)–(the actual atmospheric pressure)" by the correction coefficient satisfies a relational expression shown below.

(the reference atmospheric pressure)·{(the exhaust pressure)–(the actual atmospheric pressure)}/ (the actual atmospheric pressure)=(the reference atmospheric pressure)·(the exhaust pressure)/ (the actual atmospheric pressure)–(the reference atmospheric pressure)

The reference atmospheric pressure is a fixed value. Accordingly, a corresponding relationship between the value obtained by dividing the intake pressure by the correction coefficient and a value obtained by dividing the exhaust pressure by the correction coefficient can also be regarded as independent of the actual atmospheric pressure. For example, in the case where a corresponding relationship between two parameters A and B can be regarded as independent of the actual atmospheric pressure, on the assumption that a, b, c and d are constants (a and b may not be equal to each other but are not zero), "a·A+b" and "c·B+d" are obtained simply by changing the unit of A and B or changing the point of origin. It is therefore obvious that a corresponding relationship between "a·A+b" and "c·B+d" can also be regarded as independent of the actual atmospheric pressure.

That is, the unit will be first considered. For example, a corresponding relationship between a pair of values, that is, the value obtained by dividing the intake pressure by the correction coefficient and the value obtained by dividing the exhaust pressure by the correction coefficient can be regarded as independent of the actual atmospheric pressure even when a measurement result expressed in terms of "MPa" is obtained as to each of the pair of the values and then each of the pair of the values is converted into a value expressed in terms of "bar". In this case, the pair of the values themselves are converted into values obtained by multiplying the values expressed in terms of "MPa" by "10". By the same token, even when each of the pair of the values is replaced with a relationship between values expressed in terms of "atm", the corresponding relationship between the pair of the values can be regarded as independent of the actual atmospheric pressure. In this case, the pair of the values themselves are converted into those obtained by multiplying the values expressed in terms of "MPa" by "9.869". It is apparent from the foregoing that when the corresponding relationship between A and B can be first regarded as independent of the actual atmospheric pressure, the corresponding relationship between those obtained by multiplying A and B by the same coefficient a, namely, "a·A" and "a·B" can also be regarded as independent of the actual atmospheric pressure. Furthermore, in the case where, for example, the corresponding relationship between A and B expressed in terms of "MPa" can be regarded as independent of the atmospheric pressure even when only B is converted from a value expressed in terms of "MPa" into a value expressed in terms of "atm" or the like, the corresponding relationship between A expressed in terms of "MPa" and B expressed in terms of "atm" can also be regarded as independent of the actual atmospheric pressure. Therefore, the aforementioned coefficients a and b may not be equal to each other.

The change of intercepts b and d corresponds to the change of the point of origin. However, this change has already been made when it is mentioned in the foregoing description that "the corresponding relationship between the value obtained by dividing the intake pressure by the correction coefficient and the value obtained by dividing the exhaust pressure by the correction coefficient is independent of the actual atmospheric pressure". That is, even when the intercepts b and d are changed, the corresponding relationship between A and B is independent of the actual atmospheric pressure. Incidentally, the foregoing description is equivalent to the definition of a physical quantity through the movement of the point of origin by the reference atmospheric pressure.

Accordingly, "data that associate a normalized exhaust pressure with a normalized intake pressure" are data that allow the normalized exhaust pressure to be calculated with high accuracy from the normalized intake pressure. Then, a pumping loss torque can be calculated from a differential pressure between the exhaust pressure that can be calculated from the data and the intake pressure.

The value obtained by multiplying "(the exhaust pressure)–(the intake pressure)" by a volume that is pushed away by a piston during its displacement from a top dead center to a bottom dead center is equivalent to a pumping loss, and is proportional to the pumping loss torque. Accordingly, the value obtained by dividing the pumping loss torque by the actual atmospheric pressure is proportional to "{(the exhaust pressure)/(the actual atmospheric pressure)}–{(the intake pressure)/(the actual atmospheric pressure)}". As described above, the corresponding relationship between "(the exhaust pressure)/(the actual atmospheric pressure)" and "(the intake pressure)/(the actual atmospheric pressure)" can be regarded as independent of the actual atmospheric pressure. That is, the corresponding relationship between the value obtained by dividing the pumping loss torque by the actual atmospheric pressure and "(the intake pressure)/(the actual atmospheric pressure)" can also be regarded as independent of the actual atmospheric pressure. Accordingly, the corresponding relationship between a value obtained by changing the unit or point of origin of the value obtained by dividing the pumping loss torque by the actual atmospheric pressure and "(the intake pressure)/(the actual atmospheric pressure)" can also be regarded as independent of the actual atmospheric pressure. Moreover, the corresponding relationship between the value obtained by changing the unit or point of origin of the value obtained by dividing the pumping loss torque by the actual atmospheric pressure and the normalized intake pressure can be regarded as independent of the actual atmospheric pressure. Accordingly, "the data that associate the normalized pumping loss torque with the normalized intake pressure" are data that allow the normalized pumping loss torque to be calculated with high accuracy from the normalized intake pressure.

A control apparatus for an internal combustion engine according to the first embodiment of the disclosure will be described hereinafter with reference to the drawings.

As shown in FIG. 1, a throttle valve 14 that adjusts the flow passage cross-sectional area of an intake passage 12 of an internal combustion engine 10 is arranged in the intake passage 12. A fuel injection valve 16 is provided downstream of the throttle valve 14. The mixture of the fuel injected by the fuel injection valve 16 and the air sucked from a region upstream of the throttle valve 14 is sucked into a combustion chamber 24 that is defined by a cylinder 20 and a piston 22, as an intake valve 18 is operated to open. An ignition plug 26 is exposed to the combustion chamber 24. The mixture sucked into the combustion chamber 24 is combusted through spark discharge by the ignition plug 26. The energy generated through combustion is converted into rotational energy of a crankshaft 28 as an engine output shaft, through displacement of the piston 22. A driving wheel of a vehicle is mechanically coupled to the crankshaft 28. Therefore, the motive power of the crankshaft 28 is transmitted to the driving wheel.

The mixture combusted in the combustion chamber 24 is discharged to an exhaust passage 32 as exhaust gas, through a valve-opening operation of an exhaust valve 30. The aforementioned intake valve 18 is driven to be opened/closed in accordance with a rotational operation of a camshaft 40. The camshaft 40 for the intake valve 18 is provided with a variable valve timing mechanism 42 that adjusts the timings for opening/closing the intake valve 18, namely, valve timings of the intake valve 18. The rotating force of the crankshaft 28 is transmitted from a timing chain 44 to the variable valve timing mechanism 42, and is transmitted to the camshaft 40 via the variable valve timing mechanism 42. When the rotating force of the crankshaft 28 is transmitted to the camshaft 40, the intake valve 18 is driven to be opened/closed through rotation of a cam 43 that is provided integrally with the camshaft 40.

The variable valve timing mechanism 42 is a mechanism that changes the rotational angle of the camshaft 40 relative to the rotational angle of the crankshaft 28. The variable valve timing mechanism 42 makes the valve timings variable while fixing the lift amount and working angle of the valve, by changing the relative rotational angle.

A supercharger 50 is provided upstream of the throttle valve 14 in the aforementioned intake passage 12, and in the exhaust passage 32. An electronic control unit (an ECU) 60 is a control apparatus that is designed to control the internal combustion engine 10. The ECU 60 is equipped with a nonvolatile memory 62, which is a memory that retains data regardless of whether or not electric power is supplied thereto. The ECU 60 fetches detected values of various sensors, such as an atmospheric pressure Pa detected by an atmospheric pressure sensor 70, a rotational speed NE of the crankshaft 28 detected by a crank angle sensor 72, a coolant temperature THW of the internal combustion engine 10 detected by a coolant temperature sensor 74, an operation amount ACCP of an accelerator pedal detected by an accelerator sensor 76, and the like. Then, the ECU 60 outputs command signals MS1 to MS4 and the like to various actuators such as the throttle valve 14, the fuel injection valve 16, the ignition plug 26, the variable valve timing mechanism 42 and the like, based on those detected values, and controls the controlled variables (the torque, the air-fuel ratio and the like) of the internal combustion engine 10. In particular, the ECU 60 calculates a required axial torque Trqa* as an axial torque required of the internal combustion engine 10 based on the operation amount ACCP of the accelerator pedal, and performs so-called torque demand control for controlling the torque of the internal combustion engine 10 such that the actual axial torque of the internal combustion engine 10 becomes equal to the required axial torque Trqa*. Torque demand control will be described hereinafter in detail.

Figure 2:
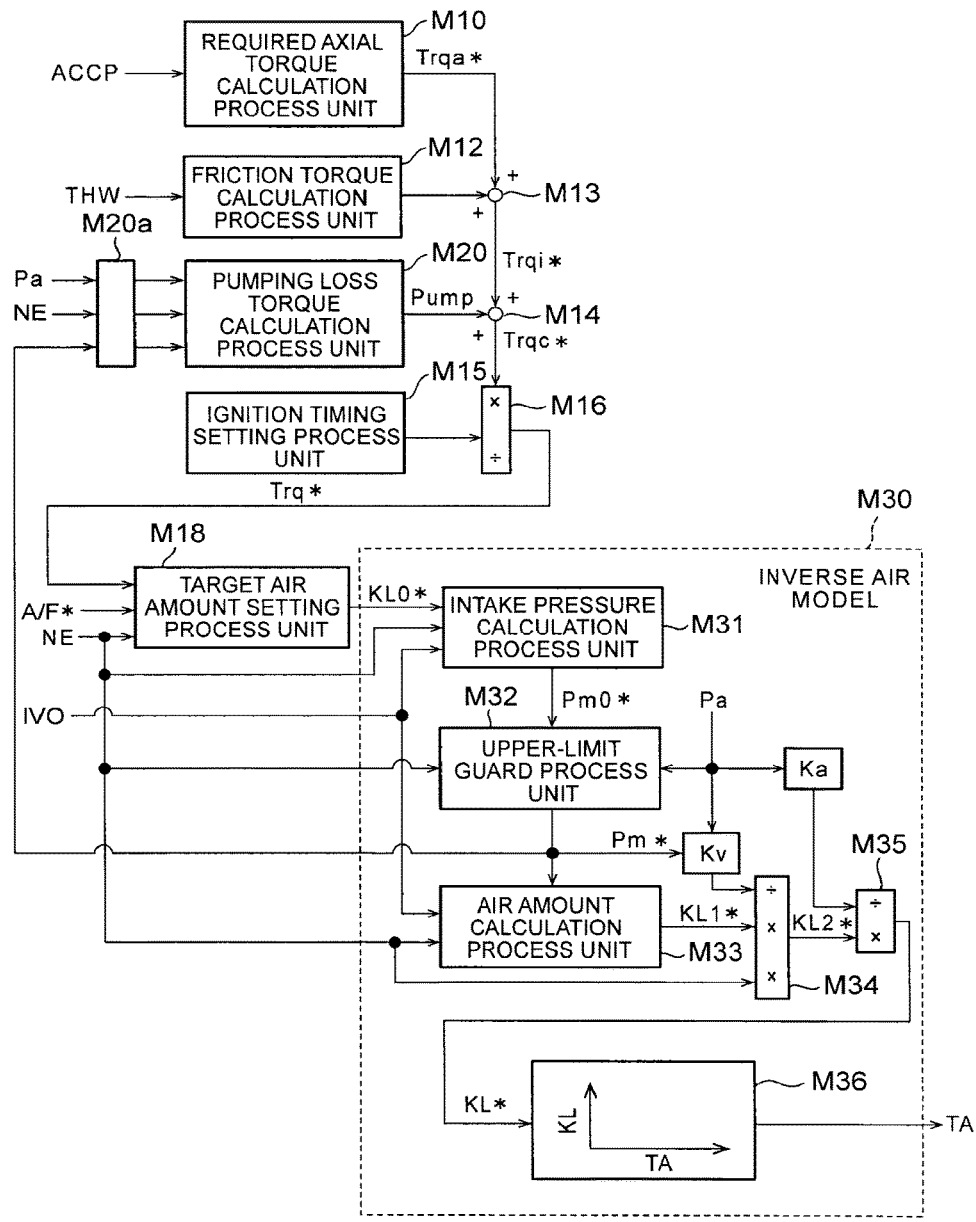
FIG. 2 is a block diagram showing a process of part of torque demand control according to the first embodiment.

FIG. 2 is a block diagram showing part of torque demand control that is performed by the ECU 60. A required axial torque calculation process unit M10 calculates the required axial torque Trqa* based on the operation amount ACCP of the accelerator pedal. The calculated required axial torque Trqa* is the sum of a torque for the driving wheel that is determined in accordance with the operation amount ACCP of the accelerator pedal, and a torque (a load torque) for auxiliaries such as an alternator, a compressor for a vehicular air-conditioner and the like. Therefore, the required axial torque calculation process unit M10 takes the operation amounts of the alternator and the compressor into account in calculating the required axial torque Trqa*.

A friction torque calculation process unit M12 calculates a friction torque between the piston 22 and the cylinder 20 of the internal combustion engine 10, based on the coolant temperature THW detected by the coolant temperature sensor 74. In an addition process unit M13, a required indicated torque Trqi* is calculated by adding the friction torque to the required axial torque Trqa*.

A pumping loss torque calculation process unit M20 calculates a pumping loss torque Pump based on outputs of a preliminary process unit M20a to which the atmospheric pressure Pa detected by the atmospheric pressure sensor 70, the rotational speed NE detected by the crank angle sensor 72, and a later-described target intake pressure Pm* are input.

An addition process unit M14 summates the required indicated torque Trqi* and the pumping loss torque Pump. The sum of the indicated torque and the pumping loss torque will be referred to hereinafter as a combustion torque. Therefore, the addition process unit M14 calculates and outputs a required combustion torque Trqc*.

An ignition timing setting process unit M15 sets an ignition timing as a timing for starting spark discharge of the ignition plug 26. The ignition timing setting process unit M15 sets the ignition timing through various kinds of well-known control such as knocking control, catalyst warmup control and the like.

An increased torque calculation process unit M16 calculates a required torque Trq* by dividing the required combustion torque Trqc* by an efficiency value output by the ignition timing setting process unit M15. A target air amount setting process unit M18, to which the required torque Trq*, the rotational speed NE and a target air-fuel ratio A/F* are input, calculates a target air amount KL0* as a target value of the amount of air sucked into the combustion chamber 24. When the actual ignition timing is a minimum advance for best torque (an MBT), which is an ignition timing with maximum engine torque generation efficiency, the target air amount setting process unit M18 sets the amount of air to be sucked into the combustion chamber 24 in realizing the required torque Trq* to the target air amount KL0*. This can be realized by storing a map as air amount conversion data that associate the required torque Trq*, the rotational speed NE and the target air-fuel ratio A/F* with the amount of air sucked into the combustion chamber 24, into the nonvolatile memory 62. This map can be created, for example, by measuring torques of the internal combustion engine 10 when the ignition timing is set to the MBT and the amount of air sucked into the combustion chamber 24, the air-fuel ratio and the rotational speed NE are set to various values respectively. The rotational speed NE mentioned herein is a value in a steady operation state of the internal combustion engine 10. The map is a collection of data that determine the values of an output variable for a plurality of mutually different values (discrete values) of an input variable respectively.

The aforementioned increased torque calculation process unit M16 is provided taking into account that the target air amount setting process unit M18 calculates the target air amount KL0* on the premise that the ignition timing is the MBT. That is, the required combustion torque Trqc* is corrected in the increased torque calculation process unit M16 such that the target air amount KL0* for realizing the required combustion torque Trqc* can be calculated by the target air amount setting process unit M18 when the actual ignition timing set by the ignition timing setting process unit M15 is not the MET. Therefore, the required torque Trq* is not a value to be realized as the combustion torque of the internal combustion engine 10, but an arithmetic parameter for controlling the combustion torque of the internal combustion engine 10 to the required combustion torque Trqc*.

An inverse air model M30 calculates an opening degree TA of the throttle valve 14 as an operation amount for controlling the axial torque of the internal combustion engine 10 to the required axial torque Trqa*, based on the target air amount KL0*, the rotational speed NE and a valve-opening timing IVO of the intake valve 18. Next, the inverse air model M30 will be described in detail.

An intake pressure calculation process unit M31 calculates a target intake pressure Pm0* based on the target air amount KL0*, the rotational speed NE and the valve-opening timing IVO of the intake valve 18. This can be realized by storing a map as intake pressure conversion data that associate the amount of air sucked into the combustion chamber 24, the rotational speed NE and the valve-opening timing IVO with the intake pressure, into the nonvolatile memory 62 in advance. This map can be created in advance, for example, by measuring intake pressures when the amount of air sucked into the combustion chamber 24, the rotational speed NE and the valve-opening timing IVO are set to various values. The intake pressure determined in the map is an intake pressure deprived of the influence of pressure pulsation, and corresponds to, for example, an average intake pressure.

An upper-limit guard process unit M32 calculates the target intake pressure Pm* by subjecting the target intake pressure Pm0* to an upper-limit guard process based on the rotational speed NE and the atmospheric pressure Pa. This process is a process of setting the target intake pressure Pm* as an upper limit when the target intake pressure Pm0* is higher than the upper limit. The upper limit is determined in accordance with the rotational speed NE, because the maximum value that can be assumed by the intake pressure depends on the rotational speed NE. The process of setting the upper limit can be realized by creating a map or a relational expression based on a measurement result obtained by measuring a maximum value of intake pressures when the rotational speed NE is set to various values and the operation amounts of the actuators are set to various values at the respective rotational speeds NE, and storing the map or the relational expression into the nonvolatile memory 62 in advance. This map or relational expression consists of respective measurement results of the atmospheric pressures Pa that are different from one another.

An air amount calculation process unit M33 calculates a target air amount KL1* based on the target intake pressure Pm*, the rotational speed NE and the valve-opening timing IVO. This can be realized by storing a map that associates the intake pressure, the rotational speed and the valve-opening timing IVO with the amount of air sucked into the combustion chamber 24, into the nonvolatile memory 62 in advance. This map can be created in advance, for example, by measuring amounts of air sucked into the combustion chamber 24 when the intake pressure, the rotational speed and the valve-opening timing IVO are set to various values. The intake pressure mentioned herein is a value deprived of the influence of pressure pulsation, and corresponds to, for example, an average. The rotational speed and the valve-opening timing are values in a steady operation state of the internal combustion engine.

An air flow rate calculation process unit M34 calculates a value obtained by multiplying the target air amount KL1* by the rotational speed NE and dividing the product by a flow velocity coefficient Kv, as a target air amount KL2* as a target value of the flow rate of air passing through the throttle valve 14. It should be noted herein that the target air amount KL1* is multiplied by the rotational speed NE in view of the fact that the number of times of the arrival of a suction stroke in which air is sucked into the combustion chamber 24 per unit time increases as the rotational speed NE rises. The product is divided by the flow velocity coefficient Kv because the flow rate of air passing through the throttle valve 14 depends on the differential pressure across the throttle valve 14 and this differential pressure across the throttle valve fluctuates. The flow velocity coefficient Kv is an arithmetic parameter for making the amount of air sucked into the combustion chamber 24 equal to the target air amount KL0* regardless of changes in the flow rate of air resulting from the differential pressure across the throttle valve, and is set based on the target intake pressure Pm* and the atmospheric pressure Pa.

An atmospheric pressure correction process unit M35 calculates a target air amount KL* as a final target value of the flow rate of air passing through the throttle valve 14 by correcting the target air amount KL2* based on an atmospheric pressure correction coefficient Ka. It should be noted herein that the atmospheric pressure correction coefficient Ka is a parameter that is variably set in accordance with the atmospheric pressure Pa.

An opening degree setting process unit M36 calculates the opening degree TA of the throttle valve 14 based on the target air amount KL*. The opening degree setting process unit M36 is configured to be equipped with a map that determines a relationship between the opening degree TA of the throttle valve 14 and the amount of air passing through the throttle valve 14 when the differential pressure across the throttle valve 14 is a reference differential pressure and the atmospheric pressure is a predetermined pressure. Therefore, when the differential pressure across the throttle valve 14 deviates from a reference value etc., the target air amount KL* that is input to the opening degree setting process unit M36 is not a command value of the amount of air actually passing through the throttle valve 14. The target air amount KL* is an arithmetic parameter for setting the opening degree TA of the throttle valve 14 to an appropriate value.

The aforementioned calculated opening degree TA is an open-loop operation amount for controlling the amount of air sucked into the combustion chamber 24 to the target air amount KL0*. The ECU 60 adjusts the opening degree of the throttle valve 14 by transmitting a command signal MS1 to the throttle valve 14, such that the calculated opening degree TA is obtained.

Figure 3:
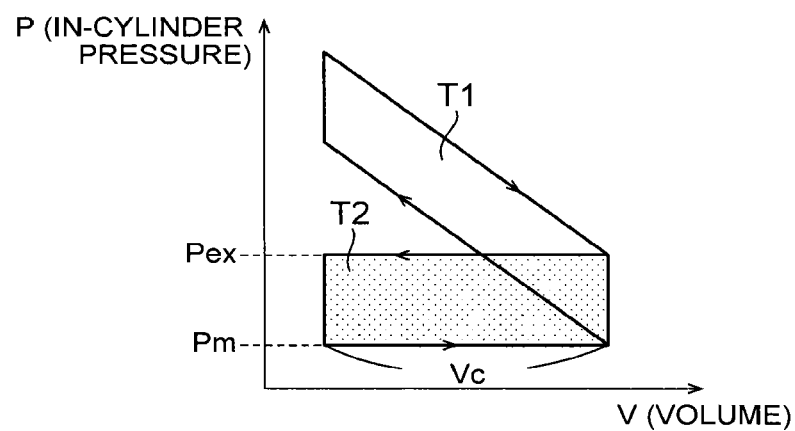
FIG. 3 is a PV diagram.

Next, processes of the aforementioned preliminary process unit M20a and the aforementioned pumping loss torque calculation process unit M20 will be described in detail. FIG. 3 is a simple PV diagram. A volume Vc shown in FIG. 3 is a volume that is pushed away by the piston 22 during displacement of the piston 22 between the top dead center and the bottom dead center. The area of a region T2 is equivalent to a pumping loss. In FIG. 3, the pressure in the combustion chamber 24 in a suction stroke is approximated as an intake pressure Pm, and the pressure in the combustion chamber 24 in an exhaust stroke is approximated as an exhaust pressure Pex. The intake pressure Pm and the exhaust pressure Pex are physical quantities that fluctuate with pressure pulsation. The averages of those physical quantities are good approximated values of the average of the pressure in the combustion chamber 24 in the suction stroke and the average of the pressure in the combustion chamber 24 in the exhaust stroke respectively. Therefore, the work applied to the piston 22 by the fluid on the combustion chamber 24 side in the suction stroke is the product of the intake pressure Pm and the volume Vc, and the work applied to the fluid on the combustion chamber 24 side by the piston 22 in the exhaust stroke is the product of the exhaust pressure Pex and the volume Vc. Therefore, the work applied to the piston 22 by the fluid on the combustion chamber 24 side in the suction stroke and a combustion stroke is "Pm·Vc−Pex·Vc".

The pumping loss torque is a physical quantity with the dimension of torque that is calculated by multiplying the pumping loss by a predetermined constant. It should be noted, however, that the pumping loss mentioned herein is defined as a work applied to the piston 22 by the fluid on the combustion chamber 24 side in the suction stroke and the combustion stroke in one cycle that is constituted of four strokes. Incidentally, since "Pm<Pex" in general, "Pm·Vc−Pex·Vc" is negative. However, the pumping loss and the pumping loss torque will be defined hereinafter as positive values in the case of "Pm<Pex".

Figure 4:
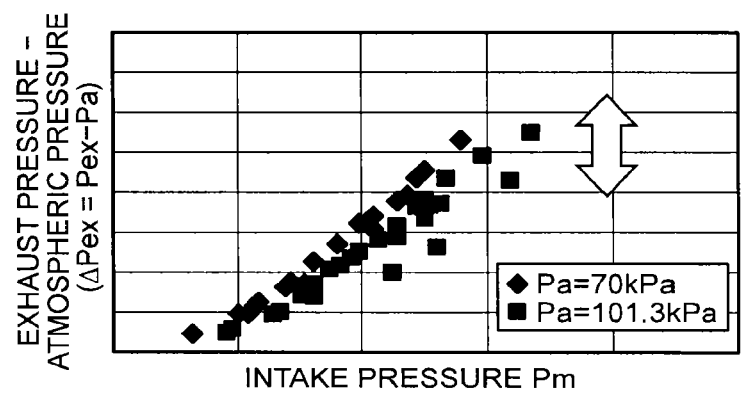
FIG. 4 represents measurement data showing a relationship between an intake pressure and "an exhaust pressure–an atmospheric pressure"

The pumping loss torque Pump can be calculated from the area of the aforementioned region T2, and hence can be calculated from the differential pressure between the intake pressure Pm and the exhaust pressure Pex. FIG. 4 shows a relationship between the intake pressure Pm and the differential pressure ΔPex (=Pex−Pa) between the atmospheric pressure Pa and the exhaust pressure Pex in the case where the rotational speed NE of the internal combustion engine 10 is constant. It should be noted, however, that the data shown in FIG. 4 consist of the data at the time when the atmospheric pressure Pa is "70 kPa" and the data at the time when the atmospheric pressure Pa is "101.3 kPa". Incidentally, the intake pressure Pm and the exhaust pressure Pex in FIG. 4 are not instantaneous values of the actual intake pressure and the actual exhaust pressure with pressure pulsation, but are averages of the intake pressure and the exhaust pressure with pressure pulsation. As shown in FIG. 4, the differential pressure ΔPex depends on the atmospheric pressure Pa as well as the intake pressure Pm.

Figure 5:
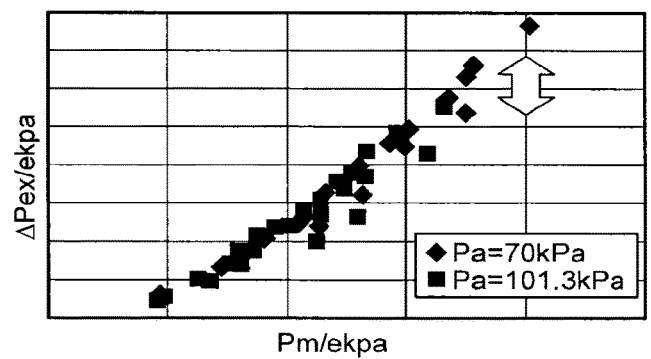
FIG. 5 represents measurement data showing a relationship between a normalized value of the intake pressure and a normalized value of "the exhaust pressure–the atmospheric pressure"

FIG. 5 shows a relationship between the value obtained by dividing the intake pressure Pm by a correction coefficient ekpa and the value obtained by dividing the differential pressure ΔPex by the correction coefficient ekpa in the case where the rotational speed NE of the internal combustion engine 10 is constant. It should be noted herein that the correction coefficient ekpa is a value obtained by dividing the actual atmospheric pressure Pa by an atmospheric pressure in a standard state (a reference atmospheric pressure Pa0). That is, "ekpa=Pa/Pa0". Incidentally, in this case, the reference atmospheric pressure is assumed to be an atmospheric pressure "102.2 kPa" at a spot located at a standard height above sea level (e.g., equal to or lower than 100 m). As shown in FIG. 5, the corresponding relationship between the value obtained by dividing the intake pressure Pm by the correction coefficient ekpa and the value obtained by dividing the differential pressure ΔPex by the correction coefficient ekpa is regarded as independent of the atmospheric pressure.

FIGS. 4 and 5 mean that the value obtained by dividing the intake pressure Pm by the correction coefficient ekpa can be associated with the value obtained by dividing the differential pressure ΔPex by the correction coefficient ekpa instead of associating the differential pressure ΔPex with two parameters, namely, the atmospheric pressure Pa and the intake pressure Pm. It should be noted herein that the value obtained by dividing the differential pressure ΔPex by the correction coefficient ekpa is a value obtained by subtracting the reference atmospheric pressure Pa0 from the value obtained by dividing the exhaust pressure Pex by the correction coefficient ekpa, as is apparent from the following calculation.

$$\Delta Pex/ekpa=(Pex-Pa)\cdot Pa0/Pa=(Pa0\cdot Pex/Pa)-Pa0=(Pex/ekpa)-Pa0$$

The aforementioned reference atmospheric pressure Pa0 is a fixed value. Therefore, when the corresponding relationship between the value obtained by dividing the intake pressure Pm by the correction coefficient ekpa and the value obtained by dividing the differential pressure ΔPex by the correction coefficient ekpa can be regarded as independent of the atmospheric pressure, the corresponding relationship between the value obtained by dividing the intake pressure Pm by the correction coefficient ekpa and the value obtained by dividing the exhaust pressure Pex by the correction coefficient ekpa can also be regarded as independent of the atmospheric pressure.

Now, this corresponding relationship is expressed as Pex/Pa=Pex0(Pm/ekpa). Then, the area of the region T2 shown in FIG. 3 is follows.

$$(\text{Area of the region } T2)=(Pex-Pm)\cdot Vc=\{Pex0(Pm/ekpa)\cdot ekpa-(Pm/ekpa)\cdot ekpa\}\cdot Vc=\{Pex0(Pm/ekpa)-(Pm/ekpa)\}\cdot Vc\cdot ekpa$$

The aforementioned equation means that the value obtained by dividing the area of the region T2 by the correction coefficient ekpa is uniquely determined by Pm/ekpa.

By the way, the pumping loss torque Pump can be calculated by dividing the area of the aforementioned region T2 by a predetermined constant. Accordingly, the value obtained by dividing the pumping loss torque Pump by the correction coefficient ekpa is uniquely determined by "Pm/ekpa". Hereinafter, the value obtained by dividing the pumping loss torque Pump by the correction coefficient ekpa will be regarded as a parameter that is normalized such that the atmospheric pressure Pa becomes equal to the reference atmospheric pressure Pa0, the value obtained by dividing the intake pressure Pm by the correction coefficient ekpa will be referred to as a normalized intake pressure Pm/ekpa, and the value obtained by dividing the pumping loss torque by the correction coefficient ekpa will be referred to as a normalized pumping loss torque Pump0. Then, the corresponding relationship between the normalized intake pressure Pm/ekpa and the normalized pumping loss torque Pump0 can be regarded as independent of the atmospheric pressure. The pumping loss torque calculation process unit M20 calculates the pumping loss torque through the use of this corresponding relationship.

Figure 6:
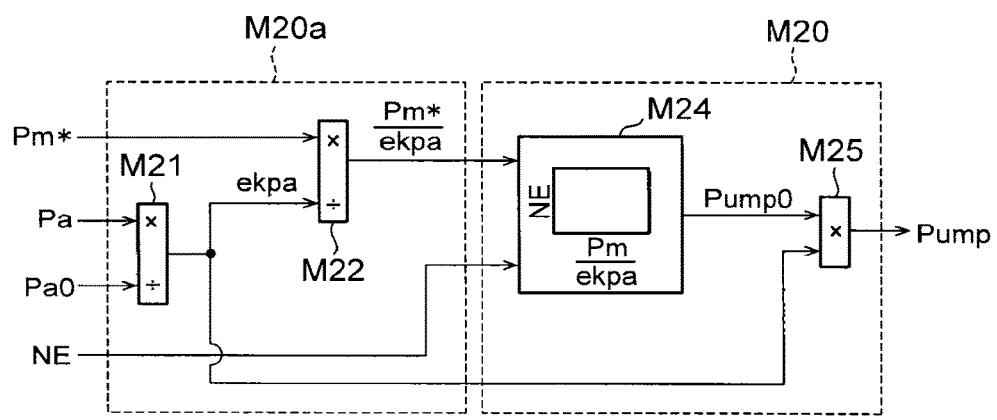
FIG. 6 is a block diagram showing processes of a preliminary process unit and a pumping loss torque calculation process unit according to the first embodiment.

FIG. 6 shows processes of the preliminary process unit M20a and the pumping loss torque calculation process unit M20. A correction coefficient calculation process unit M21 calculates the correction coefficient ekpa by dividing the atmospheric pressure Pa by the reference atmospheric pressure Pa0. A normalization process unit M22 calculates the normalized intake pressure Pm*/ekpa by dividing the target intake pressure Pm* by the correction coefficient ekpa. It should be noted herein that the preliminary process unit M20a acquires the last value of the target intake pressure Pm* and inputs the acquired value to the normalization process unit M22. This setting is made so that calculation of the target intake pressure Pm* is performed after calculation of the pumping loss torque Pump.

The pumping loss torque calculation process unit M20 calculates the pumping loss torque Pump based on the normalized intake pressure Pm*/ekpa and the rotational speed NE. In concrete terms, a normalized value calculation process unit M24 first calculates a normalized pumping loss torque Pump0 based on the normalized intake pressure Pm*/ekpa and the rotational speed NE. This can be realized by storing a map that associates the normalized intake pressure Pm*/ekpa and the rotational speed NE with the normalized pumping loss torque Pump0, into the nonvolatile memory 62 in advance, and using this map. It should be noted herein that the map is a collection of recorded data on the values of the normalized pumping loss torque Pump0 at the time when the normalized intake pressure Pm*/ekpa and the rotational speed NE are a plurality of mutually different values (discrete values) respectively. Incidentally, the map can be created by measuring the normalized pumping loss torque Pump0 in advance when the normalized intake pressure Pm*/ekpa and the rotational speed NE are set to various values. Incidentally, the rotational speed NE mentioned herein is a value in a steady operation state of the internal combustion engine 10. The intake pressure, which constitutes a basis in calculating the normalized intake pressure, is a value deprived of the influence of pressure pulsation, and corresponds to, for example, an average.

A non-normalized value calculation process unit M25 calculates the pumping loss torque Pump by multiplying the normalized pumping loss torque Pump0 by the correction coefficient ekpa. This is an output of the pumping loss torque calculation process unit M20.

Figures 7, 8:
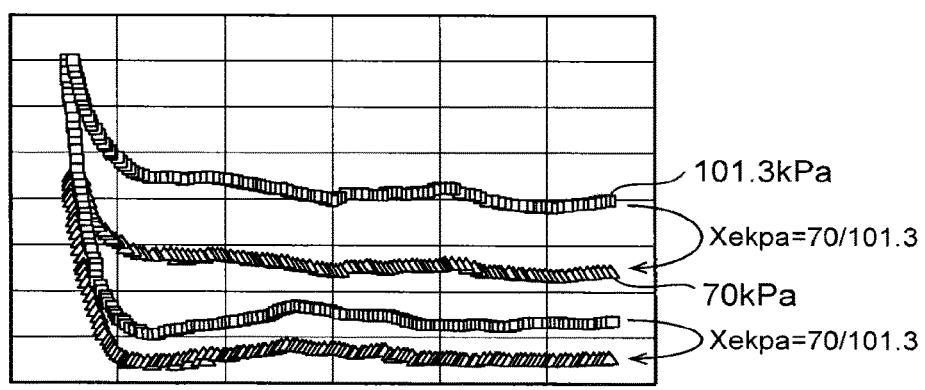
FIG. 7 is a view showing an effect of the first embodiment of the disclosure.
FIG. 8 is a PV diagram showing the technical appropriateness of the first embodiment.

FIG. 7 shows an evaluation result of the accuracy in calculating the pumping loss torque Pump by the pumping loss torque calculation process unit M20. In FIG. 7, the reference atmospheric pressure is "101.3 kPa", and the actual pumping loss torques at the time when the atmospheric pressure Pa is "70.8 kPa" and the intake pressure Pm is "32.5 kPa" and "53.7 kPa" respectively, and the pumping loss torque Pump calculated by the pumping loss torque calculation process unit M20 are shown in contrast with each other. Incidentally, in FIG. 7, when the atmospheric pressure Pa is "101.3 kPa", the actually measured value of the pumping loss torque is shown, and the pumping loss torque Pump calculated by the pumping loss torque calculation process unit M20 is not mentioned. As shown in FIG. 7, when the atmospheric pressure Pa is "70.8 kPa", the pumping loss torque Pump calculated by the pumping loss torque calculation process unit M20 coincides with the actual pumping loss torque with high accuracy.

FIG. 8 shows measured values of in-cylinder pressures in a suction stroke and an exhaust stroke when the atmospheric pressure Pa is "101.3 kPa" and "70 kPa". In the measurement result shown in FIG. 8, when the in-cylinder pressures in the suction stroke and the exhaust stroke at the time when the atmospheric pressure Pa is "101.3 kPa" are multiplied by the correction coefficient ekpa, they coincide with the in-cylinder pressures in the suction stroke and the exhaust stroke at the time when the atmospheric pressure Pa is "70 kPa" respectively, with high accuracy. This means that the values obtained by normalizing the in-cylinder pressures in the suction stroke and the exhaust stroke by the correction coefficient ekpa do not depend on the value of the atmospheric pressure Pa. This fact also indicates the appropriateness of handling the normalized intake pressure and the like in the present embodiment of the disclosure.

The operation of the present embodiment of the disclosure will now be described. In the normalized value calculation process unit M24, the normalized pumping loss torque Pump0 is calculated based on the normalized intake pressure Pm*/ekpa, which is calculated from the atmospheric pressure Pa and the target intake pressure Pm*, and the rotational speed NE. Then in the non-normalized value calculation process unit M25, the pumping loss torque Pump is calculated by multiplying the normalized pumping loss torque Pump0 by the correction coefficient ekpa.

According to the present embodiment of the disclosure described above, the effects mentioned below are obtained.

(1) After the normalized value calculation process unit M24 calculates the normalized pumping loss torque Pump0 based on the normalized intake pressure Pm*/ekpa and the rotational speed NE, the non-normalized value calculation process unit M25 calculates the pumping loss torque Pump by multiplying the normalized pumping loss torque Pump0 by the correction coefficient ekpa. Therefore, the pumping loss torque Pump can be calculated through simple arithmetic operation, by adapting relational data (a map) that associate two parameters, namely, the normalized intake pressure Pm*/ekpa and the rotational speed NE with the normalized pumping loss torque Pump0. In contrast, when the normalized intake pressure Pm*/ekpa is not used, the exhaust pressure Pex depends on the intake pressure Pm and the atmospheric pressure Pa. Therefore, there is a need to adapt relational data that associate three parameters, namely, the rotational speed NE, the intake pressure Pm and the atmospheric pressure Pa with the pumping loss torque Pump. It should be noted herein that 1000 values are adapted as the value of the pumping loss torque Pump, for example, in the case where the value of the pumping loss torque Pump is adapted when each of the rotational speed NE, the intake pressure Pm and the atmospheric pressure Pa assumes 10 mutually different values. On the other hand, it is sufficient to adapt only 100 values as the value of the normalized pumping loss torque Pump0 in the case where the value of the normalized pumping loss torque Pump0 is adapted when each of the normalized intake pressure Pm*/ekpa and the rotational speed NE assumes 10 mutually different values.

Therefore, in the present embodiment of the disclosure, the pumping loss torque can be calculated from the intake pressure and the atmospheric pressure while restraining the man-hour for adaptation from increasing. (2) The reference atmospheric pressure Pa0 that is used in the correction coefficient ekpa is an atmospheric pressure that is assumed at a spot located at a height of 100 m or less above sea level. Therefore, the normalized intake pressure Pm*/ekpa and the normalized pumping loss torque Pump0 can be made approximately equal to the target intake pressure Pm* and the pumping loss torque Pump respectively except when the vehicle runs on a highland.

(3) The opening degree TA of the throttle valve 14 is calculated based on the required combustion torque Trqc* that is obtained by adding the pumping loss torque Pump to the required indicated torque Trqi*. Therefore, the opening degree TA of the throttle valve 14 can be calculated with high accuracy in consideration of the pumping loss torque Pump.

(4) The target air amount KL0* is set based on the required combustion torque Trqc* that is obtained by adding the pumping loss torque Pump to the required indicated torque Trqi*. Therefore, the number of parameters to be taken into account in setting the target air amount KL0* can be reduced. In contrast, in the case where the target air amount KL0* is set from the required indicated torque Trqi*, the parameters utilized to calculate the pumping loss torque Pump are considered to be necessary in addition to the required indicated torque Trqi*, the target air-fuel ratio A/F* and the rotational speed NE in setting the target air amount KL0*.

(5) The target intake pressure Pm* is used as the intake pressure that is used to calculate the pumping loss torque Pump. Thus, the pumping loss torque corresponding to the intake pressure assumed through the process of setting the opening degree TA of the throttle valve 14 by the opening degree setting process unit M36 can be calculated.

A control apparatus for an internal combustion engine according to the second embodiment of the disclosure will be described hereinafter with reference to the drawings, focusing on what is different from the first embodiment of the disclosure.

Figure 9:
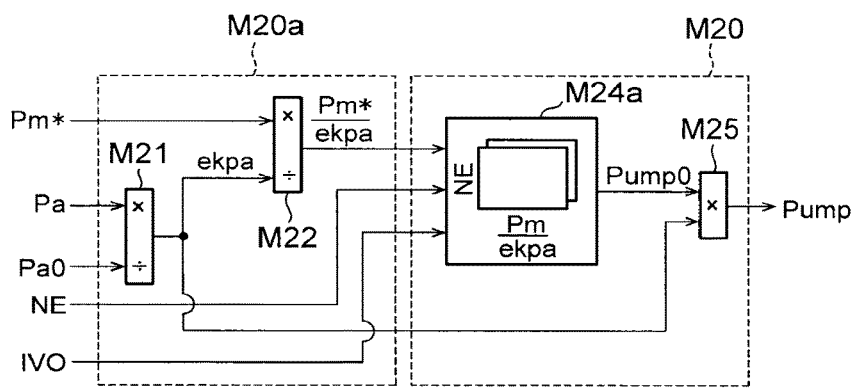
FIG. 9 is a block diagram showing processes of a preliminary process unit and a pumping loss torque calculation process unit according to the second embodiment.

FIG. 9 shows processes of the preliminary process unit M20a and the pumping loss torque calculation process unit M20 according to the present embodiment of the disclosure. Incidentally, the processes corresponding to those shown in FIG. 6 are denoted by the same reference symbols respectively in FIG. 9, for the sake of convenience.

In the present embodiment of the disclosure, the normalized value calculation process unit M24a calculates the normalized pumping loss torque Pump0 based on the valve-opening timing IVO of the intake valve 18 in addition to the normalized intake pressure Pm*/ekpa and the rotational speed NE. This can be realized by storing a map that associates the normalized intake pressure Pm*/ekpa and the rotational speed NE with the normalized pumping loss torque Pump0, into the nonvolatile memory 62 in advance, when the valve-opening timing IVO of the intake valve 18 coincides with the top dead center of the piston 22 and when the valve-opening timing IVO of the intake valve 18 is the most retarded timing, respectively.

Figure 10:
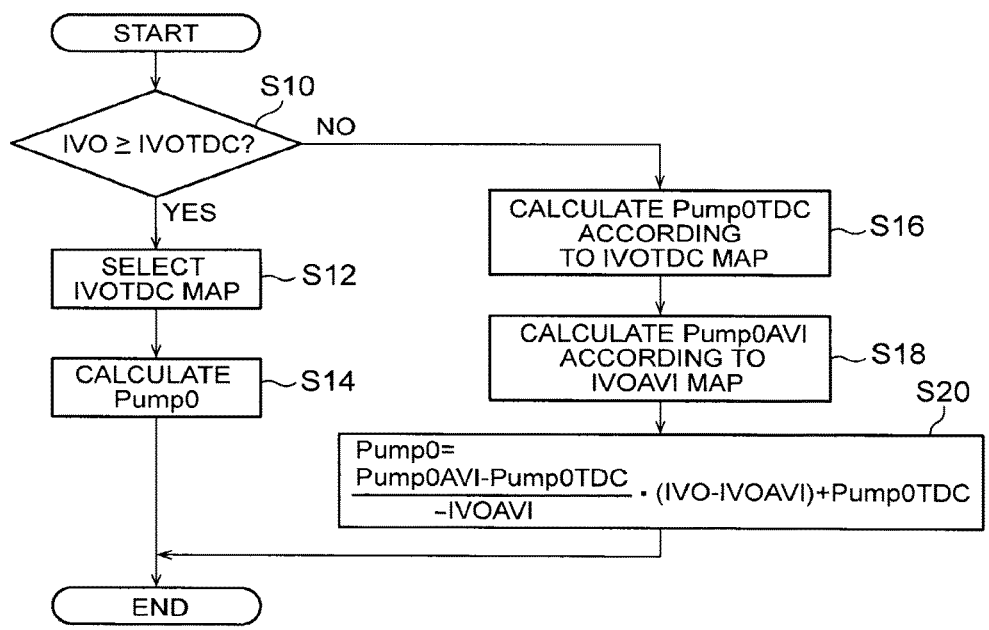
FIG. 10 is a flowchart showing a process procedure of a normalized value calculation process unit according to the second embodiment.

FIG. 10 shows the procedure of processes of calculating the normalized pumping loss torque Pump0 according to the present embodiment of the disclosure. These processes are repeatedly executed, for example, on a predetermined cycle by the normalized value calculation process unit M24a.

In the series of the processes shown in FIG. 10, the normalized value calculation process unit M24a first determines whether or not the valve-opening timing IVO is a valve-opening timing IVOTDC that coincides with the top dead center of the piston 22 or is advanced from the valve-opening timing IVOTDC that coincides with the top dead center of the piston 22 (S10). Incidentally, in this process, the valve timing is quantified in such a manner as to increase as the amount of advancement with respect to a most retarded timing IVOAVI increases, with reference to the time when the valve-opening timing IVO is the most retarded timing IVOAVI. That is, the valve-opening timing IVO is quantified as "15°" when the valve-opening timing IVO is "15° ATDC" in the case where the most retarded timing IVOAVI is "30° ATDC". It should be noted, however, that the most retarded timing IVOAVI is expressed as an absolute value, and is assumed to be "30°".

If it is determined that the valve-opening timing IVO is the valve-opening timing IVOTDC or is advanced therefrom (YES in S10), the normalized value calculation process unit 24a selects the map that associates the normalized intake pressure Pm*/ekpa and the rotational speed NE with the normalized pumping loss torque Pump0 when the valve-opening timing IVO is the aforementioned valve-opening timing IVOTDC (S12). Then, the normalized value calculation process unit M24a calculates the normalized pumping loss torque Pump0 based on the selected map (S14). Therefore, the normalized value calculation process unit M24a calculates the normalized pumping loss torque Pump0 from the same single map regardless of whether the valve-opening timing IVO is advanced from the valve-opening timing IVOTDC or equal to the valve-opening timing IVOTDC. This takes the following into account. That is, in the case where the valve-opening timing IVO of the intake valve 18 is advanced from the valve-opening timing IVOTDC to a certain extent, even if the valve-opening timing IVO of the intake valve 18 is further advanced, the amount of work applied to the piston 22 by intake air does not change when the piston 22 begins to be displaced toward the bottom dead center. Therefore, the sensitivity of the pumping loss torque Pump in response to the valve-opening timing IVO disappears.

On the other hand, if it is determined that the valve-opening timing IVO is retarded from the aforementioned valve-opening timing IVOTDC (NO in S10), the normalized value calculation process unit M24a calculates the normalized pumping loss torque Pump0 through the use of both the aforementioned maps. That is, the normalized value calculation process unit M24a first calculates a normalized pumping loss torque Pump0TDC based on the map that associates the normalized intake pressure Pm*/ekpa and the rotational speed NE with the normalized pumping loss torque Pump0 when the valve-opening timing IVO is the aforementioned valve-opening timing IVOTDC (S16). Besides, the normalized value calculation process unit M24a calculates a normalized pumping loss torque Pump0AVI based on the map that associates the normalized intake pressure Pm*/ekpa and the rotational speed NE with the normalized pumping loss torque Pump0 when the valve-opening timing IVO is the most retarded timing IVOAVI (S18). Then, the normalized value calculation process unit M24a calculates the normalized pumping loss torque Pump0 based on a process of obtaining a weighted average of the normalized pumping loss torque Pump0TDC and the normalized pumping loss torque Pump0AVI (S20). In concrete terms, the normalized value calculation process unit M24a uses the following equation.

$$\text{Pump0} = \{(\text{Pump0}AVI - \text{Pump0}TDC) \cdot (IVO - IVOAVI)/(-IVOAVI)\} \pm \text{Pump0}TDC$$

This is an interpolating arithmetic operation that takes into account the fact that the pumping loss monotonically increases because the work applied to the piston 22 by intake air decreases as the valve-opening timing IVO is retarded from the top dead center TDC, when the work applied to the piston 22 by the working fluid is assumed to be positive.

Incidentally, when the processes of step S14 and step S20 are completed, the normalized value calculation process unit M24a temporarily ends this series of processes. A control apparatus for an internal combustion engine according to the third embodiment of the disclosure will be described hereinafter with reference to the drawings, focusing on what is different from the first embodiment of the disclosure.

Figure 11:
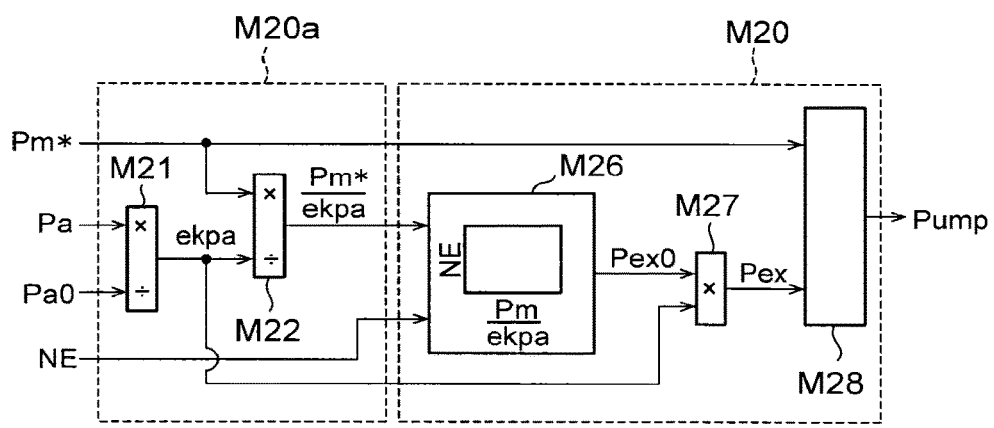
FIG. 11 is a block diagram showing processes of a preliminary process unit and a pumping loss torque calculation process unit according to the third embodiment.

FIG. 11 shows processes of the preliminary process unit M20a and the pumping loss torque calculation process unit M20 according to the present embodiment of the disclosure. Incidentally, the processes corresponding to those shown in FIG. 6 are denoted by the same reference symbols respectively in FIG. 11, for the sake of convenience.

As shown in FIG. 11, in the present embodiment of the disclosure, a normalized value calculation process unit M26 calculates a normalized exhaust pressure Pex0, which is a value obtained by dividing the exhaust pressure Pex by the correction coefficient ekpa, based on a normalized intake pressure Pm*/ekpa and the rotational speed NE. This takes into account the fact that the corresponding relationship between the normalized intake pressure Pm*/ekpa and the normalized exhaust pressure Pex0 can be regarded as independent of the atmospheric pressure as described with reference to FIGS. 3 and 4 in the first embodiment of the disclosure. Therefore, in the present embodiment of the disclosure, a map that associates the normalized intake pressure Pm*/ekpa and the rotational speed NE with the normalized exhaust pressure Pex0 is stored into the nonvolatile memory 62 in advance, and the normalized exhaust pressure Pex0 is calculated based on this map.

A non-normalized value calculation process unit M27 calculates the exhaust pressure Pex by multiplying the normalized exhaust pressure Pex0 by the correction coefficient ekpa. Then in an output unit M28, the pumping loss torque Pump is calculated based on the differential pressure between the exhaust pressure Pex and the target intake pressure Pm*.

At least one of the respective items in the aforementioned embodiments of the disclosure may be modified as follows.

The preliminary process unit M20a is not absolutely required to acquire the target intake pressure Pm*. For example, in the case where there is provided a sensor that detects the pressure in the intake passage 12 downstream of the throttle valve 14, the intake pressure acquisition process unit M20a may acquire a detected value of the sensor. In this case, however, it is desirable to sample the detected value of the sensor a plurality of times at intervals shorter than "720°/(the number of cylinders)", and acquire a moving average of those sampled values as a parameter for calculating the pumping loss torque Pump, but the disclosure is not limited thereto. For example, the detected value may be sampled once in such a manner as to correspond to fuel injection in each of the cylinders, and the sampling timing may be adapted such that the sampled value becomes equivalent to the aforementioned average. Incidentally, the utilization of the average is not limited to cases where the detected value of the sensor is sampled. For example, when a transient flow state of the fluid is also calculated through the use of a model instead of calculating the averages of the intake pressure Pm and the amount of air as in the case of the aforementioned inverse air model M30, it is desirable to acquire an average of a plurality of sampled values of the intake pressure output by the model, and sampled values at predetermined timings.

Incidentally, even in the case where a sensor is provided, the effects such as the aforementioned (5) and the like are undoubtedly achieved by acquiring the target intake pressure Pm*. The preliminary process unit M20a is not absolutely required to use the atmospheric pressure Pa detected by the atmospheric pressure sensor 70, but may use an estimated value that is estimated in the ECU 60. This can be realized, for example, through a process of operating an estimated value of the atmospheric pressure as an operation amount for decreasingly controlling the error between the amount of intake air detected by an airflow meter and the estimated amount of air.

As for the normalized intake pressure and the normalization process unit M22, the reference atmospheric pressure Pa0 is not limited to the aforementioned values. For example, the reference atmospheric pressure Pa0 may be "95 to 105 kPa". Besides, for example, the reference atmospheric pressure Pa0 may be "70 to 105 kPa". Besides, it is not indispensable to set the reference atmospheric pressure Pa0 used in the correction coefficient ekpa to the value that is assumed at the spot located at the height above sea level that is assumed when the vehicle runs. For example, the correction coefficient may be "Pa/1" or "Pa/0.01" In sum, it is sufficient that the correction coefficient be expressed as "a·(Pm/Pa)+b" using the coefficient a (a real number other than 0) determined in advance and the intercept b, in other words, be a value of a linear function in which "Pm/Pa" is an independent variable. This is because the value of the linear function in which "Pm/Pa" is an independent variable is obtained simply by changing the unit of "Pm/ekpa" or changing the point of origin. That is, even when the unit of the axis of abscissa or the point of origin is changed in, for example, FIG. 5, the degree of dispersion of plotted points does not change. Therefore, the corresponding relationship between the value of the linear function in which "Pm/Pa" is an independent variable and "Pm/ekpa" in the aforementioned embodiments of the disclosure can be regarded as independent of the atmospheric pressure. Therefore, effects similar to those of the aforementioned embodiments of the disclosure can be achieved. In contrast, for example, in the case where the values of a quadratic function and a cubic function in which "Pm/Pa" is an independent variable are used, when a relationship between those values and "ΔPex/ekpa" is plotted, the distribution shown in FIG. 5 is not guaranteed to be maintained. The possibility of the occurrence of a dispersion as shown in FIG. 4 is undeniable.

The normalized pumping loss torque is not limited to the value "Pump/ekpa" that is obtained by dividing the pumping loss torque Pump by the correction coefficient ekpa. In sum, it is sufficient that the normalized pumping loss torque be expressed as "c·(Pump/ekpa)+d" using a coefficient c (a real number other than 0) determined in advance and the intercept d, in other words, be the value of a linear function in which "Pump/ekpa" is an independent variable. Although this is the same, the normalized pumping loss torque may be the value of a linear function in which "Pump/Pa" is an independent variable. The value of this linear function is obtained simply by changing the unit of "Pump/ekpa" or the point of origin. Therefore, the corresponding relationship between the value of the linear function and the normalized intake pressure can be regarded as independent of the atmospheric pressure. Therefore, effects similar to those of the aforementioned embodiments of the disclosure can be achieved.

The normalized exhaust pressure is not limited to the value "Pex/Pa" that is obtained by dividing the exhaust pressure Pex by the correction coefficient ekpa. In sum, it is sufficient that the normalized exhaust pressure be expressed as "e·(Pex/Pa)+f" using a coefficient e (a real number other than 0) determined in advance and an intercept f, in other words, be the value of a linear function in which "Pex/Pa" is an independent variable. The value of this linear function is obtained simply by changing the unit of "Pex/ekpa" or the point of origin. Therefore, the corresponding relationship between the value of the linear function and the normalized intake pressure can be regarded as independent of the atmospheric pressure. Therefore, effects similar to those of the aforementioned embodiments of the disclosure can be achieved.

The non-normalized value calculation process units M25 and M27 are not absolutely required to multiply the output value of the normalized value calculation process unit by the correction coefficient ekpa. For example, in the aforementioned third embodiment of the disclosure (FIG. 11), when the map utilized by the normalized value calculation process unit M26 associates the normalized intake pressure Pm/ekpa with the value obtained by dividing the aforementioned differential pressure ΔPex by the correction coefficient ekpa, the reference atmospheric pressure Pa0 is first added to the output value of the normalized value calculation process unit M26, and the sum is then multiplied by the correction coefficient ekpa. Thus, the exhaust pressure Pex can be calculated in the same manner as in the aforementioned third embodiment of the disclosure. Besides, instead of this calculation, the output value of the normalized value calculation process unit M26 may be multiplied by the correction coefficient ekpa, and then the atmospheric pressure Pa may be added to the product. In this manner as well, the exhaust pressure Pex can be calculated in the same manner as in the aforementioned third embodiment of the disclosure.

In each of the aforementioned embodiments of the disclosure, as for the prescribed value for determining the amount of advancement with respect to the top dead center TDC, the normalized pumping loss torque Pump0 is calculated from the same map as in the case where the valve-opening timing IVO coincides with the top dead center TDC, when the valve-opening timing IVO is advanced with respect to the top dead center TDC, but the disclosure is not limited thereto. In other words, when the amount of advancement of the valve-opening timing IVO with respect to the top dead center TDC is equal to or larger than the prescribed value, the normalized pumping loss torque Pump0 is calculated through the use of the same map as in the case where the amount of advancement of the valve-opening timing IVO with respect to the top dead center TDC is equal to the prescribed value, and the prescribed value is set to zero, but the disclosure is not limited thereto. For example, the prescribed value may be larger than zero. This takes into account the fact that the pumping loss torque in the case where the valve-opening timing IVO of the intake valve 18 is advanced from the top dead center TDC can be different from the pumping loss torque in the case where the valve-opening timing IVO coincides with the top dead center TDC, as a result of a delay in response of intake air. It should be noted herein that the prescribed value may be set to such an amount of advancement that the pumping loss does not change even when the valve-opening timing IVO of the intake valve 18 is further advanced.

As for the relational data, in the aforementioned second embodiment of the disclosure, the map in the case where the valve-opening timing IVO of the intake valve 18 coincides with the top dead center TDC and the map in the case where the valve-opening timing IVO of the intake valve 18 is the most retarded timing IVOAVI are provided, but the disclosure is not limited thereto. For example, maps may be provided respectively as to cases where the valve-opening timing assumes three or more mutually different timings.

In the map that associates the normalized intake pressure Pm/ekpa with the normalized pumping loss torque Pump0 and the map that associates the normalized intake pressure Pm/ekpa with the normalized exhaust pressure Pex0, it is not indispensable to associate the normalized intake pressure Pm/ekpa with the normalized pumping loss torque Pump0 or the normalized exhaust pressure Pex0 for each of the mutually different rotational speeds NE. Even the data at the single rotational speed NE are effective in calculating the pumping loss torque with high accuracy, for example, in the case where the rotational speed NE in the actual operation range of the internal combustion engine 10 is limited. Incidentally, the intended purpose of limiting the rotational speed NE is considered to include the act of making the torque variable by fixing the rotational speed when the internal combustion engine 10 is in operation in, for example, a series hybrid vehicle, and the like.

In addition to the normalized intake pressure, the rotational speed NE and the valve-opening timing IVO, the data may associate the ignition timing with the normalized pumping loss torque and the normalized exhaust pressure. Thus, the normalized pumping loss torque and the normalized exhaust pressure can be calculated in consideration of changes in the pumping loss torque resulting from changes in the exhaust pressure ascribable to the ignition timing.

The maps are not indispensable. For example, relational expressions may be used. That is, for example, in the aforementioned third embodiment of the disclosure, the coefficient α and the intercept β in "(Pex/ekpa)=α·(Pm/ekpa)+β" may be adapted for each of the rotational speeds NE. In this case, however, the relational expression is not absolutely required to be a linear expression. Even in the case where the relational expression is thus used, the man-hour for adaptation can be reduced through the use of the normalized intake pressure Pm*/ekpa. That is, for example, when the normalized intake pressure Pm*/ekpa is not used instead of the first embodiment of the disclosure, the relational expression that associates the intake pressure Pm, the atmospheric pressure Pa and the rotational speed NE with the pumping loss torque Pump is adapted. Since there are a great number of variables, the man-hour for adaptation increases.

In the first embodiment of the disclosure (FIG. 6) and the second embodiment of the disclosure (FIG. 9), the pumping loss torque calculation process unit M23 is configured to output the output value of the non-normalized value calculation process unit M25, but the disclosure is not limited thereto. For example, when the normalized value calculation process units M24 and M24a utilize a map that does not associate the normalized pumping loss torque Pump0 with the ignition timing, the value obtained by correcting the output value of the non-normalized value calculation process unit M25 based on the ignition timing may be output. Thus, even when the map that does not associate the normalized pumping loss torque with the ignition timing is utilized, the pumping loss torque Pump and the exhaust pressure Pex that take into account changes in the pumping loss torque resulting from changes in the exhaust pressure ascribable to the ignition timing can be output.

The variable valve characteristic mechanism is not limited to the variable valve timing mechanism 42. For example, a variable valve working angle mechanism that makes the working angles of valves variable may be employed. In this case as well, it is effective to use relational data that associate the valve-opening timing of the intake valve 18 with the normalized pumping loss torque Pump0.

The operation amount setting process units M16, M18 and M30 may be equipped with a map that determines how the required combustion torque Trqc*, the air-fuel ratio A/F and the rotational speed NE are related to the intake pressure in the target air amount setting process unit M18 for each of the ignition timings, instead of being equipped with the increased torque calculation process unit M16.

The upper-limit guard process unit M32 may not be provided. In this case, the target intake pressure Pm0* calculated by the intake pressure calculation process unit M31 may be input to the preliminary process unit M20a, and the flow velocity coefficient Kv may be calculated based on the target intake pressure Pm0* calculated by the intake pressure calculation process unit M31.

The opening degree setting process unit M36 is not absolutely required to use the data that associate the intake air amount with the opening degree TA of the throttle valve 14 when the differential pressure between the region upstream of the throttle valve 14 and the region downstream of the throttle valve 14 is the reference differential pressure. For example, the data that associate the intake air amount with the opening degree TA of the throttle valve 14 may be provided for each of mutually different values of the aforementioned differential pressure, and the opening degree TA may be set using those data. In this case, the correction may not be made with the flow velocity coefficient Kv in the air flow rate calculation process unit M34.

The use of the inverse air model M30 is not indispensable either. For example, an intake pressure sensor may be provided, the target air amount KL0* set by the target air amount setting process unit M18 may be converted into the target amount of air passing through the throttle valve 14, and the opening degree TA of the throttle valve 14 for achieving the target air amount may be set based on the differential pressure between the atmospheric pressure Pa and the intake pressure Pm detected by the intake pressure sensor. This can be realized by preparing a map that associates the target air amount and the differential pressure with the opening degree.

As for the internal combustion engine, the fuel injection valve is not absolutely required to inject fuel into the intake passage 12. For example, the fuel injection valve may directly inject fuel into the combustion chamber 24.

The spark ignition internal combustion engine is not indispensable. For example, a compression ignition internal combustion engine such as a diesel engine or the like may be employed. In this case as well, for example, when torque demand control is performed using the required combustion torque Trqc*, it is effective to calculate the pumping loss torque Pump in the manner of the aforementioned embodiments of the disclosure.

What is claimed is:

1. A control apparatus for an internal combustion engine, the internal combustion engine including an intake passage, an exhaust passage and an actuator, the control apparatus comprising:
   an electronic controller configured to:
   acquire an intake pressure in the intake passage;
   acquire an atmospheric pressure;
   calculate a normalized intake pressure, the normalized intake pressure being a pressure obtained by normalizing the intake pressure using a correction coefficient that is based on the atmospheric pressure;
   calculate a pumping loss torque of the internal combustion engine based on the normalized intake pressure;
   calculate a first value or a value of a linear function in which the first value is an independent variable as the normalized intake pressure, the first value being obtained by dividing the intake pressure by the atmospheric pressure;
   store relational data, the relational data being data that associate an output value normalized using the correction coefficient that is based on the atmospheric pressure with the normalized intake pressure;
   calculate the output value based on the normalized intake pressure and the relational data,
   the output value being one of a second value obtained by dividing the pumping loss torque by the atmospheric pressure, a normalized pumping loss torque as a value of a linear function in which the second value is an independent variable, a third value obtained by dividing an exhaust pressure as a pressure in the exhaust passage by the atmospheric pressure, and a normalized exhaust pressure as a value of a linear function in which the third value is an independent variable;
   calculate one of the pumping loss torque based on the normalized pumping loss torque and the atmospheric pressure, and the exhaust pressure based on the normalized exhaust pressure and the atmospheric pressure, the exhaust pressure being utilized to calculate the pumping loss torque based on a differential pressure from the intake pressure;
   set an operation amount of the actuator of the internal combustion engine based on one of the calculated pumping loss torque that is based on the normalized pumping loss torque and the atmospheric pressure, and the calculated pumping loss torque that is based on a differential pressure from the intake pressure; and
   output a command signal to the actuator of the internal combustion engine to control the actuator of the internal combustion engine to the set operation amount.

2. The control apparatus according to claim 1, wherein
   the output value normalized by the atmospheric pressure is the normalized pumping loss torque,
   the electronic controller is configured to calculate the normalized pumping loss torque based on the normalized intake pressure, and
   the electronic controller is configured to calculate the pumping loss torque based on the normalized pumping loss torque and the atmospheric pressure.

3. The control apparatus according to claim 2, wherein
   the internal combustion engine is further equipped with a variable valve characteristic mechanism, the variable valve characteristic mechanism is configured to change a valve characteristic of an intake valve of the internal combustion engine,
   the relational data relate a valve-opening timing of the intake valve to the normalized pumping loss torque in addition to the normalized intake pressure, the relational data associate the normalized pumping loss torque such that the normalized pumping loss torque when the valve-opening timing is on a retardation side is larger than the normalized pumping loss torque when the valve-opening timing is on an advancement side, and
   the electronic controller is configured to calculate the normalized pumping loss torque based on the valve-opening timing and the relational data in addition to the normalized intake pressure.

4. The control apparatus according to claim 3, wherein
   the electronic controller is configured to calculate a same value of the normalized pumping loss torque as in a case where an amount of advancement of the valve-opening timing with respect to a top dead center of a piston is equal to a prescribed value, when the amount of advancement is equal to or larger than the prescribed value, and
   the prescribed value is a value equal to or larger than zero.

5. The control apparatus according to claim 4, wherein
   the relational data include first data and second data, the first data is a data when the amount of advancement of the valve-opening timing with respect to the top dead center of the piston is equal to the prescribed value, and the second data is a data when the valve-opening timing is most retarded, and
   the electronic controller is configured to calculate the output value normalized by the atmospheric pressure through an interpolating arithmetic operation of the output value normalized by the atmospheric pressure in each of the first data and the second data, when the amount of advancement of the valve-opening timing with respect to the top dead center of the piston is smaller than the prescribed value.

6. The control apparatus according to claim 1, wherein
   the output value normalized by the atmospheric pressure is the normalized exhaust pressure,
   the electronic controller is configured to calculate the normalized exhaust pressure based on the normalized intake pressure,
   the electronic controller is configured to calculate the exhaust pressure based on the normalized exhaust pressure and the atmospheric pressure, and the electronic controller is configured to calculate the pumping loss torque based on the differential pressure between the exhaust pressure and the intake pressure.

7. The control apparatus according to claim 1, wherein
the relational data relate a rotational speed of the internal combustion engine to the output value in addition to the normalized intake pressure, and
the electronic controller is configured to calculate the output value based on the rotational speed and the relational data in addition to the normalized intake pressure.

8. The control apparatus according to claim 3, wherein
the relational data relate a rotational speed of the internal combustion engine to the output value in addition to the normalized intake pressure and the valve-opening timing, and
the electronic controller is configured to calculate the output value based on the normalized intake pressure, the valve-opening timing, the rotational speed and the relational data.

9. The control apparatus according to claim 1, wherein
the electronic controller is configured to calculate a required axial torque of the internal combustion engine,
the electronic controller is configured to calculate a required indicated torque of the internal combustion engine based on a process of adding a friction torque of the internal combustion engine to the required axial torque, and
the electronic controller is configured to set the operation amount of the actuator of the internal combustion engine based on a value obtained by adding the pumping loss torque to the required indicated torque.

10. The control apparatus according to claim 9, wherein
the internal combustion engine includes a throttle valve,
the electronic controller is configured to store air amount conversion data and intake pressure conversion data,
the air amount conversion data associate the value obtained by adding the pumping loss torque to the required indicated torque with a target air amount, and the intake pressure conversion data associate the target air amount with the intake pressure, and
the electronic controller is configured to calculate the target air amount using the air amount conversion data and then execute a process of calculating a target intake pressure using the calculated target air amount and the intake pressure conversion data, the target air amount being an arithmetic parameter to set an opening degree of the throttle valve, and a process of acquiring the intake pressure being a process of acquiring the target intake pressure.

11. A control method for an internal combustion engine, the internal combustion engine including an intake passage, an exhaust passage and an actuator, the control method comprising:

acquiring an intake pressure of the intake passage with an intake pressure sensor;
acquiring an atmospheric pressure with an atmospheric pressure sensor;
calculating, with an electronic controller, a normalized intake pressure, the normalized intake pressure being a pressure obtained by normalizing the intake pressure using a correction coefficient that is based on the atmospheric pressure;
calculating, with the electronic controller, a pumping loss torque of the internal combustion engine based on the normalized intake pressure;
calculating, with the electronic controller, a first value or a value of a linear function in which the first value is an independent variable as the normalized intake pressure, the first value being obtained by dividing the intake pressure by the atmospheric pressure;
storing relational data in a memory, the relational data being data that associate an output value normalized using the correction coefficient that is based on the atmospheric pressure with the normalized intake pressure,
calculating, with the electronic controller, the output value based on the normalized intake pressure and the relational data, the output value being one of a second value obtained by dividing the pumping loss torque by the atmospheric pressure, a normalized pumping loss torque as a value of a linear function in which the second value is an independent variable, a third value obtained by dividing an exhaust pressure as a pressure in the exhaust passage by the atmospheric pressure, and a normalized exhaust pressure as a value of a linear function in which the third value is an independent variable;
calculating, with the electronic controller, one of the pumping loss torque based on the normalized pumping loss torque and the atmospheric pressure, and the exhaust pressure based on the normalized exhaust pressure and the atmospheric pressure, the exhaust pressure being utilized to calculate the pumping loss torque based on a differential pressure from the intake pressure;
setting, with the electronic controller, an operation amount of the actuator of the internal combustion engine based on one of the calculated pumping loss torque that is based on the normalized pumping loss torque and the atmospheric pressure, and the calculated pumping loss torque that is based on a differential pressure from the intake pressure; and
outputting, with the electronic controller, a command signal to the actuator of the internal combustion engine to control the actuator of the internal combustion engine to the set operation amount.

* * * * *